(12) United States Patent
Dakka et al.

(10) Patent No.: US 7,617,182 B2
(45) Date of Patent: Nov. 10, 2009

(54) DOCUMENT CLUSTERING BASED ON ENTITY ASSOCIATION RULES

(75) Inventors: Wisam Dakka, New York, NY (US); Silviu-Petru Cucerzan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 249 days.

(21) Appl. No.: 11/650,902

(22) Filed: Jan. 8, 2007

(65) Prior Publication Data

US 2008/0168019 A1  Jul. 10, 2008

(51) Int. Cl.
 *G06F 7/00* (2006.01)
(52) U.S. Cl. ............... 707/2; 707/6; 707/7; 707/104.1; 706/18; 706/20; 706/45
(58) Field of Classification Search ................. None
 See application file for complete search history.

(56) References Cited

U.S. PATENT DOCUMENTS 7,231,384 B2 * 6/2007 Wu et al. ................. 707/3

FOREIGN PATENT DOCUMENTS

EP       1 591 924 A1     4/2005

WO  PCT/US2008/050547    1/2008

OTHER PUBLICATIONS

Agrawal et al., "Fast Algorithms for Mining Assocation Rules", Proceedings of the 20th VLDB Conference Santiago, Chile, 1994, pp. 1-13.*
Song et al., "A New Document Clustering Algorithm based on Association Rule", Proceedings of the Third International Conference on Machine Learning and Cybernetics, Shanghai, Aug. 26-29, 2004, pp. 1310-1313.*
Rakesh Agrawal "Mining Association Rules between Sets of Items in Large Databases" pp. 1-10 Proceedings of the 1993 ACM SIGMOD Conference, Washington D.C., May 1993.

* cited by examiner

*Primary Examiner*—Hung Q Pham
(74) *Attorney, Agent, or Firm*—Joseph R. Kelly; Westman, Champlin & Kelly, P.A.

(57) ABSTRACT

For each document in a document set, entities are identified and a set of association rules, based on appearance of the entities in the paragraphs of the documents in the set, are derived. Documents are clustered based on the association rules. As documents are added to the clusters, additional association rules specific to the clusters can optionally be derived as well.

14 Claims, 7 Drawing Sheets

DOCUMENT CLUSTERING BASED ON ENTITY ASSOCIATION RULES

BACKGROUND

Document clustering is a process by which textual documents are analyzed and grouped by some predetermined criteria, such as by topic. Document clustering usually involves topic detection and tracking of documents and it becomes beneficial when dealing with large collections of documents. Such collections might include, for example, news stories of major news providers. Document clustering is also important because of the large number of documents currently available in a wide variety of different contexts, such as on the World Wide Web.

Arranging these large collections of documents by topic, for instance, allows users to easily browse these topics by moving from one document on a given topic to another document on the same topic. Unless the documents are arranged by topic, this cannot be done.

Some current clustering systems treat each document simply as a group of words (or "bag of words") and generate a vector having features that indicate the presence or absence of words in the bag. Also, some current approaches identify named entities in the documents and give them preferential treatment in the vector, with respect to other words in the "bag of words".

In such systems, an incoming document that is to be clustered has a vector generated for it. It is compared with the representative vectors, called centroids, associated with each previously defined cluster. The document is assigned to the cluster with the centroid that is the closest to the vector for the incoming document. Where named entities are identified and given preferential treatment by increasing their weights in the corresponding vectors, two vectors that have numerous named entities in common will typically be closer to each other in the induced vectorial space than to other documents that do not contain the same named entities.

The discussion above is merely provided for general background information and is not intended to be used as an aid in determining the scope of the claimed subject matter.

SUMMARY

For each document in a document set, entities are identified and a set of association rules, based on appearance of the entities in text paragraphs, are derived. Documents are clustered based on the association rules. As documents are added to the clusters, additional association rules can be derived as well.

This Summary is provided to introduce a selection of concepts in a simplified form that are further described below in the Detailed Description. This Summary is not intended to identify key features or essential features, of the claimed subject matter, nor is it intended to be used as an aid in determining the scope of the claimed subject matter. The claimed subject matter is not limited to implementations that solve any or all disadvantages noted in the background.

DETAILED DESCRIPTION

For purposes of this discussion, "entities" refers to words that are useful in identifying important aspects of a body of text in which they appear. For instance, the important aspects may include the overall subject matter of the body of text, speakers in the body of text, places mentioned in the body of text, etc. Entities can include a wide variety of different things such as named entities (described in greater detail below), terms that are tagged as encyclopedia entities (such as manually tagged terms that appear in on-line, community generated encyclopedias), and search terms obtained from search engine query logs, to name a few. For the sake of example, the present discussion proceeds with reference to "named entities". However, it will be recognized that this is but one example of an entity that can be used and does not limit the invention.

Figure 1:
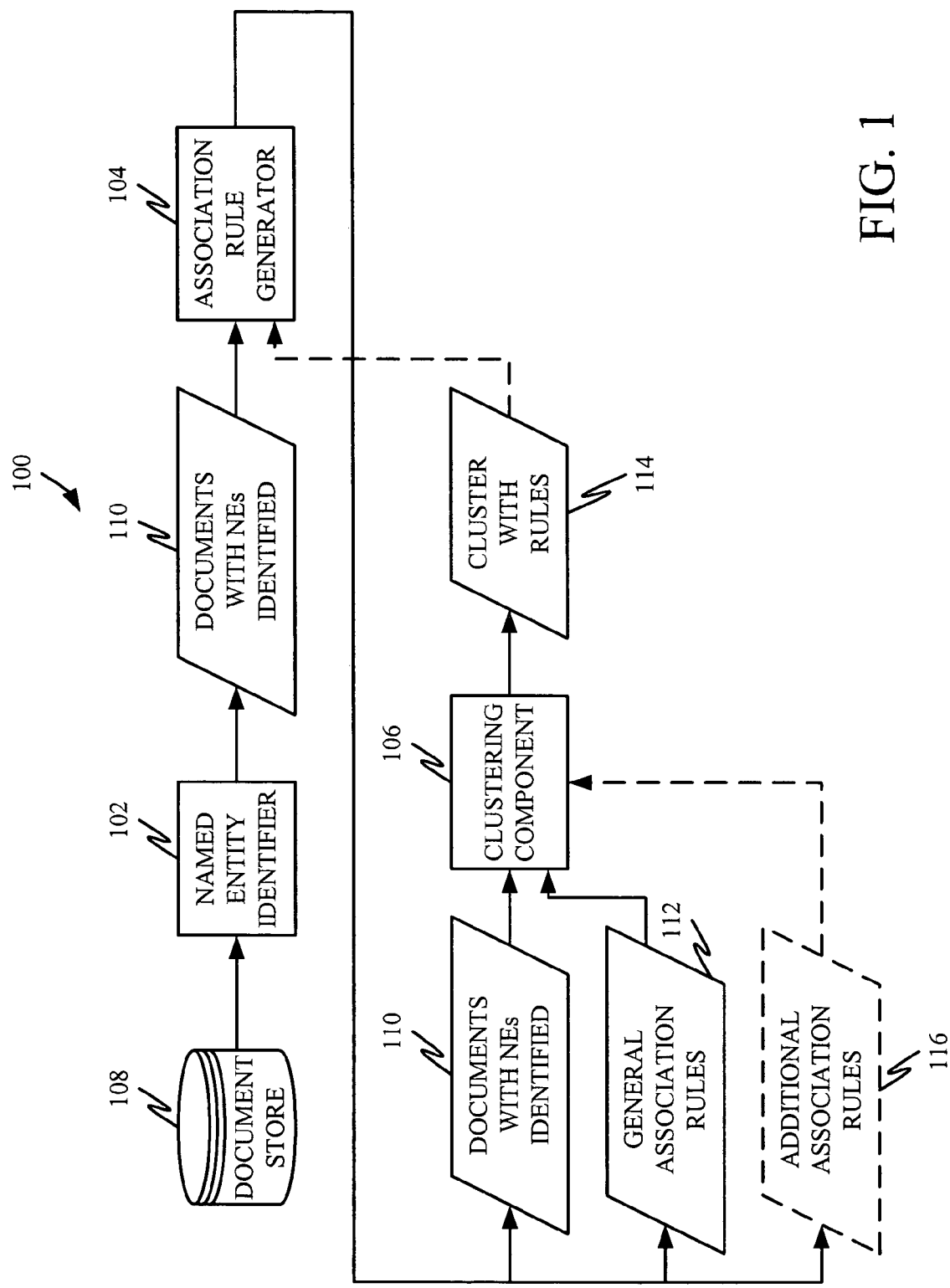
FIG. 1 is a block diagram of one illustrative clustering system.

FIG. 1 is a block diagram of a system 100 in which a set of documents are processed and an initial set of association rules over the space of named entities identified in the documents are generated. In system 100, the documents are then clustered based on the association rules that they match. Topics are automatically detected based on the derived clusters and association rules that associate the documents with those topics are generated.

In the specific embodiment shown in FIG. 1, system 100 includes a named entity identifier 102, association rule generator 104, and clustering component 106. System 100 is also shown having access to document store 108 that contains a plurality of documents, or a document set, from which the clusters and association rules are to be generated. For instance, in one exemplary embodiment, document store 108 stores a large set of news articles written about various topics in the news.

Figure 2:
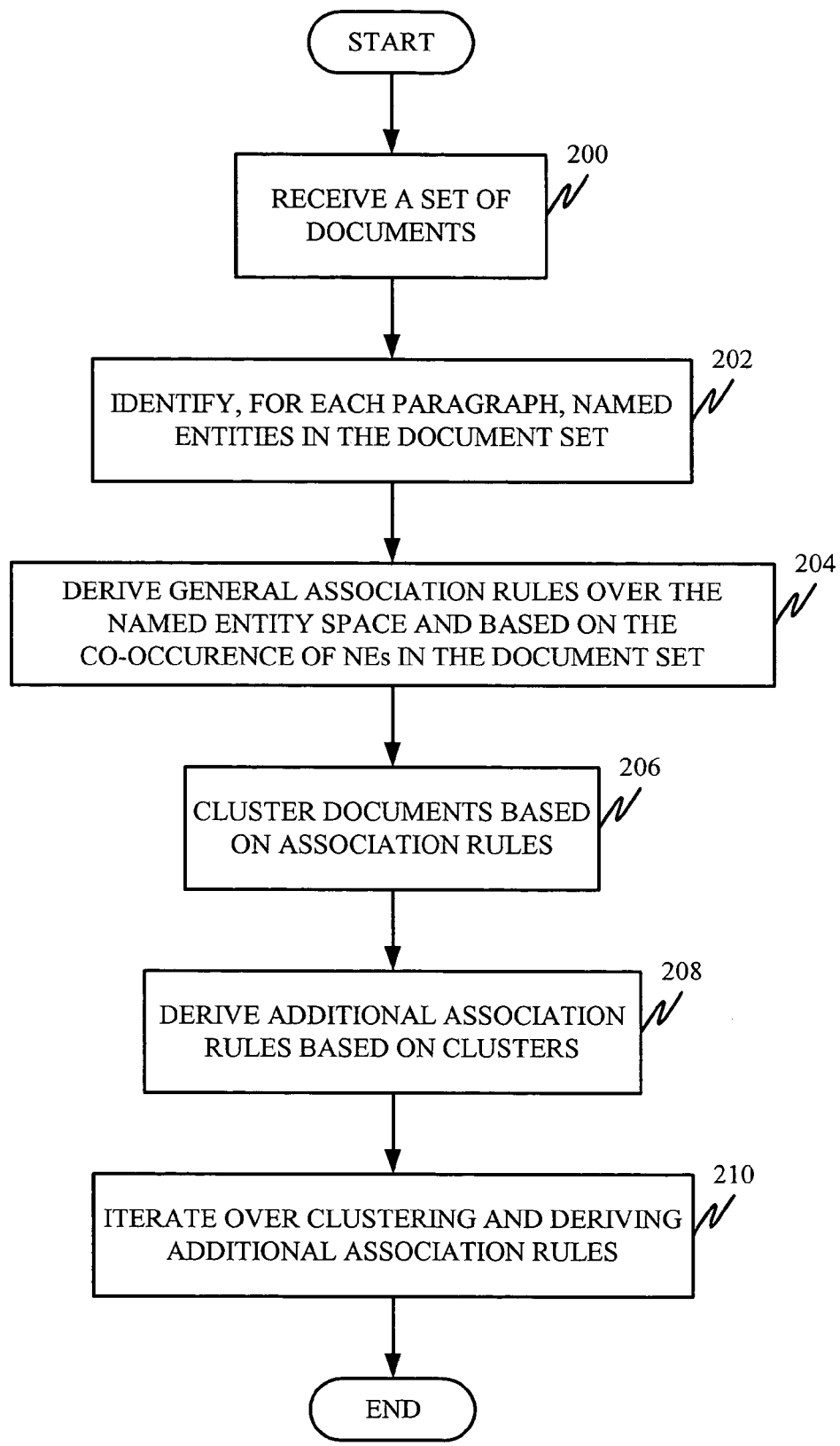
FIG. 2 is a flow diagram illustrating one embodiment of the operation of the system shown in FIG. 1.

FIG. 2 is a flow diagram illustrating one illustrative embodiment of the operation of system 100 shown in FIG. 1, in generating the clusters from the document set in document store 108, and in deriving association rules that can be used to cluster documents. FIGS. 1 and 2 are now described in conjunction with one another.

Named entity identifier 102 first receives, or accesses, the set of documents in document store 108. This is indicated by block 200 in FIG. 2. Named entity identifier 102 identifies named entities (NEs) that exist in the document. Named entity identifier 102 can be implemented using any known named entity identifier. Named entities, for purposes of the present discussion, include such things as names of individuals and companies, names of places, names of organizations, and other terms that can be recognized as a single entity (such as White House or Mt. Rushmore) or the names of products, etc.

Once the named entities are identified, as indicated by block 202 in FIG. 2, the documents with named entities identified 110 are provided to association rule generator 104. Association rule generator 104 derives general association rules and, illustratively, confidences, for each of those rules, based on the co-occurrence of named entities within the paragraphs of the set of documents. This is indicated by block 204 in FIG. 2.

The association rules illustratively indicate that if a given first set of words (or NEs) occur in a paragraph, a given second set of words also appears. For instance, assume that one of the paragraphs of text in the set of documents is a paragraph of news text as follows:

"The Red Cross is not aware of any health. problems associated with the violations, spokesman Ryland Dodge said. The FDA said the nations blood supply remains safe."

The named entities in the paragraph include "Red Cross", "Ryland Dodge", and "FDA". Therefore, that paragraph of news text is reduced to the named entities which it contains (Red Cross, Ryland Dodge, and FDA). The paragraph is viewed as a transaction over the space of named entities in the paragraph, and association rules are derived over that transaction. If FDA occurs often (such as a desired threshold number of times) when the other two entities are present in a paragraph then an association rule may be derived of the following form:

Red Cross, Ryland Dodge FDA

This means that, in a paragraph where "Red Cross" and "Ryland Dodge" appear, the named entity "FDA" also likely appears. Note that, in one embodiment, the association rules are directional. Therefore, if the rule Red Cross, Ryland Dodge FDA, is generated, it does not mean that Red Cross, FDA Ryland Dodge is also necessarily generated, since there may be many paragraphs that contain FDA and Red Cross but not Ryland Dodge. The frequency threshold can be chosen empirically, or otherwise.

In any case, if entities in an association rule appear in an input document, then that document is said to match the association rule derived from the original set. For the entire set of documents, association rule generator 104 derives association rules over the space of named entities in the collection based on the redundancy of named entity co-occurrence in the transactions (i.e., in the text paragraphs of the documents).

By way of additional example, assume that a collection of articles is being processed that are generally written about the topic "Hurricane Season". Association rule generator 104 will derive association rules such as "Atlantic, Hamilton Bermuda", and "New Orleans, FEMA Hurricane Katrina". The general association rules derived by association rule generator 104 are indicated by block 112 in FIG. 1.

Once the association rules 112 are generated, clustering component 106 can cluster documents that have had their named entities identified. Therefore, named entity identifier 102 identifies named entities in documents from the document set in document store 108, and provides them to clustering component 106. The documents with the named entities identified are indicated at 110.

Clustering component 106 uses the association rules 112 to place the documents with named entities identified 110 into clusters. In one embodiment, the clustering component 106 identifies the number of rules that a given document matches in each of the clusters. In one embodiment, the cluster that has the most matching rules to the document being analyzed is the cluster in which the document is placed.

In another embodiment, each of the association rules has a corresponding confidence measure. The confidence measure is a measure of the redundancy with which the rule is generated throughout the document set. The more the rule matches the documents in the set, the higher the confidence measure. Clustering component 106 can then take into account not only the number of rules matched by the input document under analysis, but the confidence associated with those rules as well. Clustering the documents based on association rules is indicated by block 206 in FIG. 2.

In another embodiment, after the documents are placed into clusters based on the set of association rules extracted from the whole document set, new association rules are extracted for each cluster based only on the documents assigned to the cluster. For example, an association rule such as "New Orleans, Superdome FEMA" may not be obtainable from the whole set of documents, as New Orleans and Superdome also occur frequently without FEMA in sport news; by contrast, this rule may have enough support to be extracted only from the documents contained in a cluster about Hurricane Katrina.

As additional documents are added to the clusters, additional association rules can be derived for each particular cluster. To achieve this, the document clusters, along with their rules 114 (in FIG. 1) can be provided back to association rule generator 104. Therefore, association rule generator generates additional rules 116, which can be used in subsequent clustering by clustering component 106. Deriving the additional association rules is indicated by block 208 in FIG. 2.

System 100 can also optionally iterate over clustering with clustering component 106 based upon the current association rules and providing the new clusters back to association rule generator 104 to generate additional association rules. Clustering component 106 can then cluster based on the additional association rules as well. Iteration over clustering and deriving additional association rules is indicated by block 210 in FIG. 2.

It will also be noted that, in accordance another embodiment, as clustering component 106 identifies rules that are matched by an incoming document, the redundancy (or confidence level) of those rules is increased. Thus, the redundancy of the rules is affected as the documents are being clustered.

Figure 3:
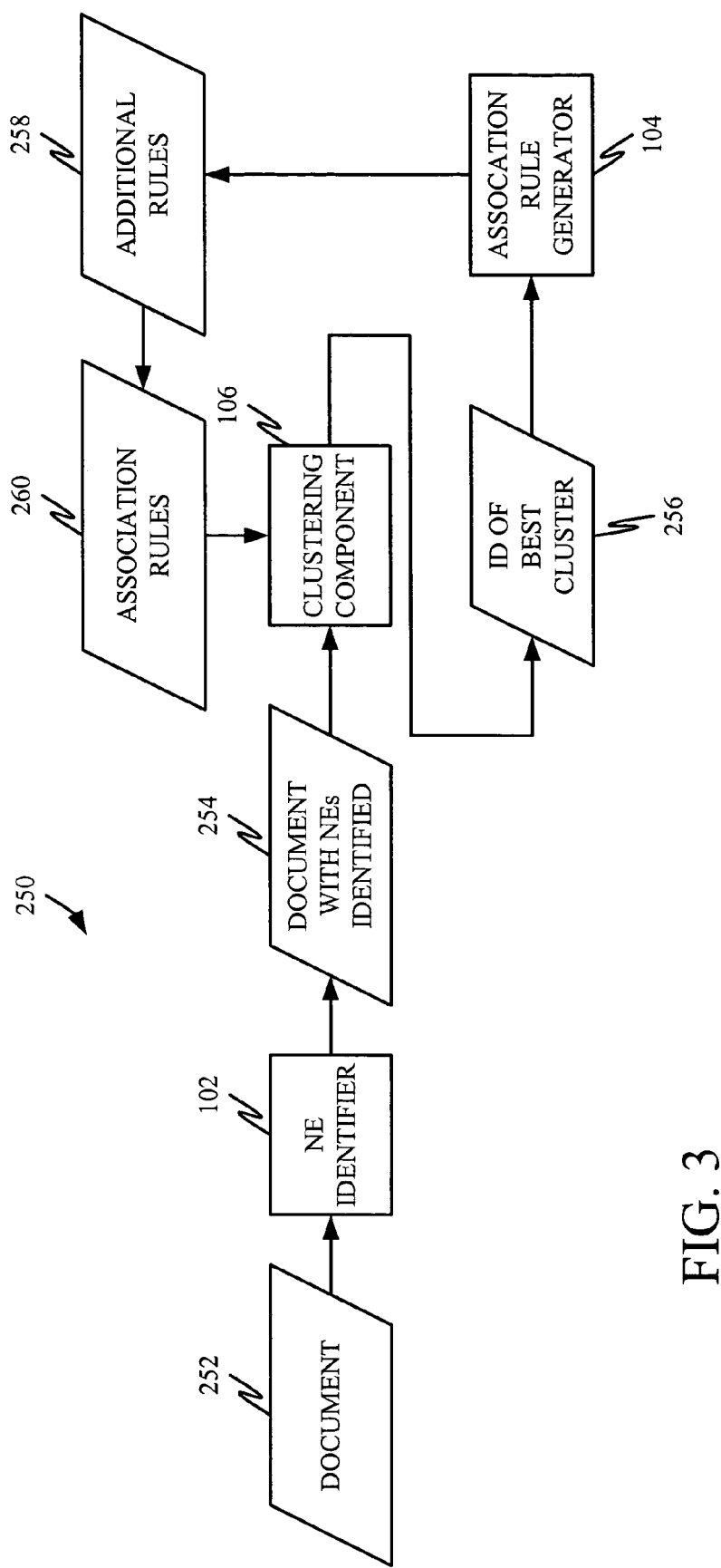
FIG. 3 is a block diagram of an embodiment of a clustering system for clustering incoming documents.
Figure 4:
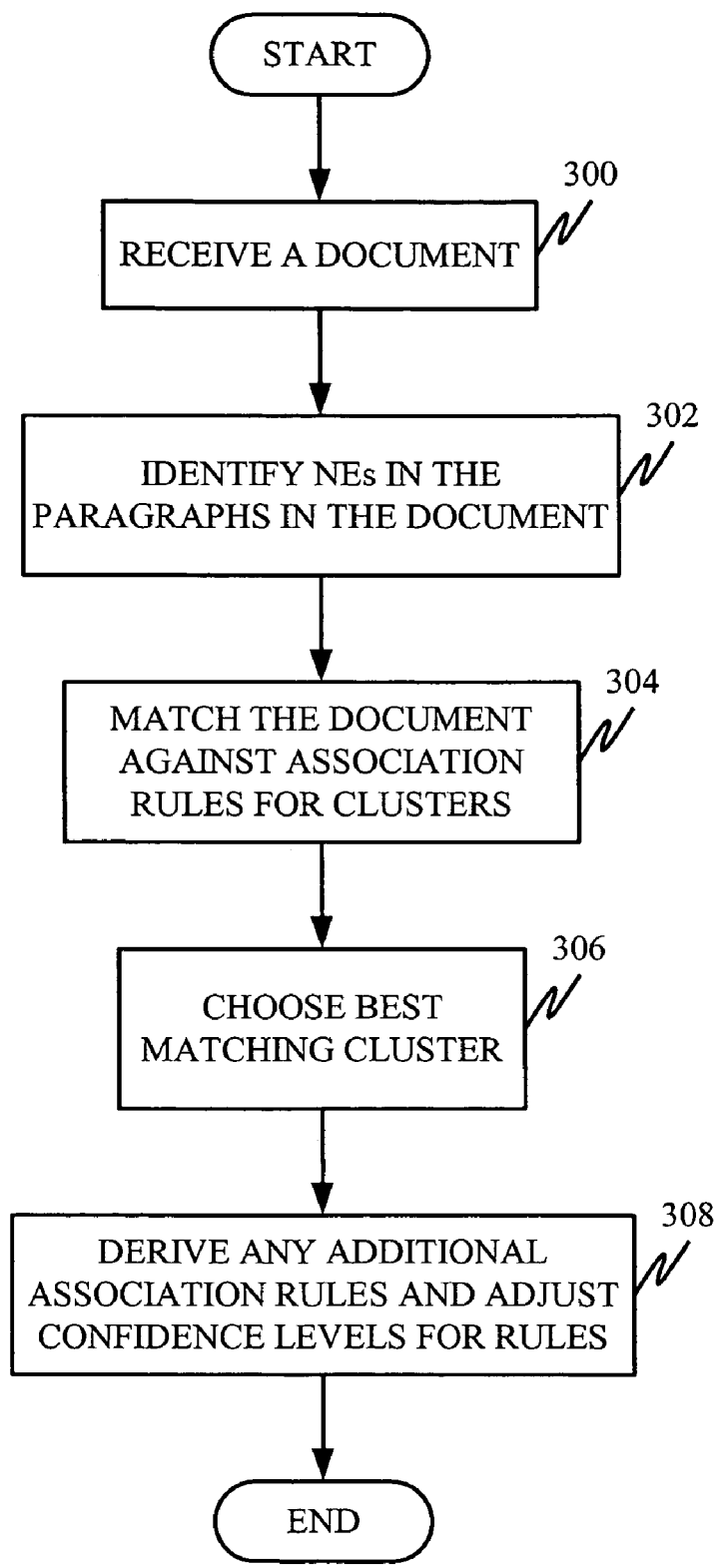
FIG. 4 is a flow diagram illustrating one embodiment of the operation of the system shown in FIG. 3.

Once the set of clusters, along with the association rules, have been derived as in FIG. 1, additional documents can be clustered given the derived clusters and association rules. FIG. 3 shows a block diagram of clustering system 250 that can be used to cluster additional documents. System 250 includes some of the same components as system 100 shown in FIG. 1, but they are slightly rearranged. FIG. 4 is a flow diagram illustrating one illustrative embodiment of the operation of system 250 shown in FIG. 3.

NE identifier 102 first receives the new document to be clustered. The document is indicated by numeral 252 in FIG. 3. Receiving the document is indicated by block 300 in FIG. 4.

NE identifier 102 then identifies the NEs in the paragraphs in document 252. The document with its NEs identified is indicated by 254 in FIG. 3 and identifying those NEs is indicated by block 302 in FIG. 4.

Clustering component 106 then accesses the previously derived association rules 260 and matches the document against the association rules 260 for the clusters which have been previously defined. This is indicated by block 304 in FIG. 4. Based on the number of rules matched, and possibly the confidence of those rules, or based on another metric given the matches to association rules, clustering component 106 identifies the best matching cluster 256 for the input document 252. Choosing the best matching cluster based on the rules matched is indicated by block 306 in FIG. 4.

Because document 252 has now been assigned to a cluster, it is possible that additional association rules can be derived for that cluster. Therefore, association rule generator 104 attempts to generate additional rules 258. Generator 104 also adjusts the confidence measure for each matched rule, indicating that it has been matched. Deriving the additional association rules and adjusting the confidence measures (if they are used) for the rules is indicated by block 308 in FIG. 4.

Figure 5:
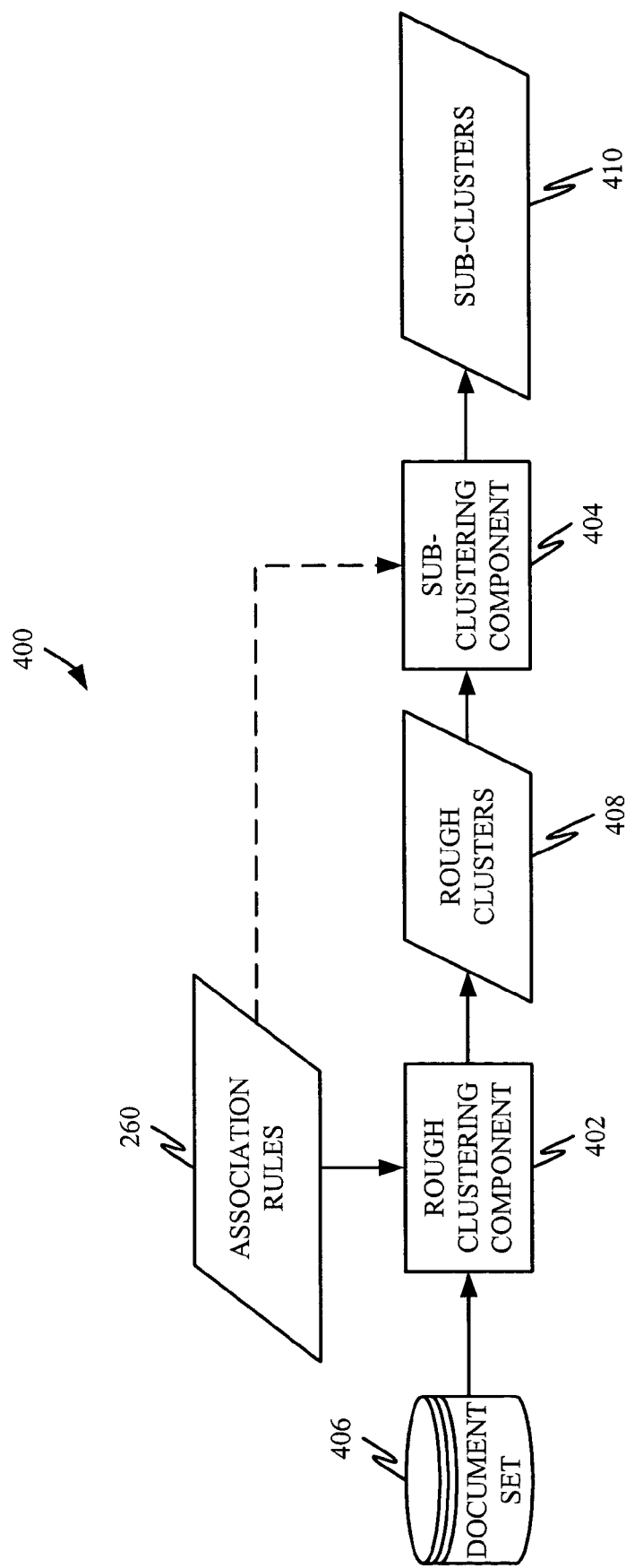
FIG. 5 is a block diagram of one illustrative embodiment of a multiple tier clustering system.
Figures 6, 6A:
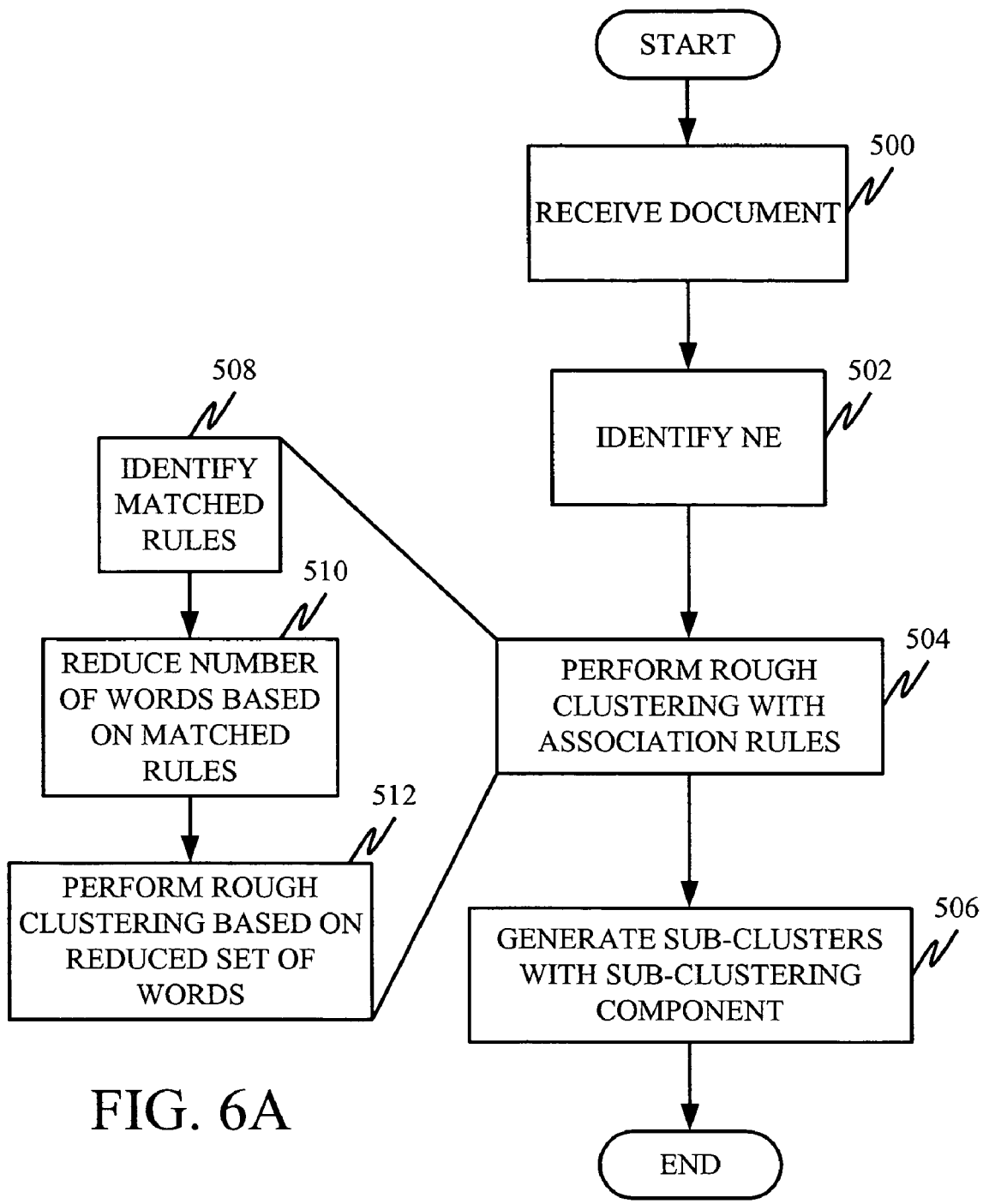
FIG. 6 is a flow diagram illustrating one embodiment of the operation of the system shown in FIG. 5.
FIG. 6A is a flow diagram showing a more detailed operation of one step shown in FIG. 6.

FIG. 5 shows another clustering system 400. Clustering system 400 performs two rounds of clustering, the first round generating clusters based on general association rules, and the second round generating sub-clusters of the original clusters. FIG. 6 is a flow diagram illustrating one illustrative embodiment of the operation of system 400 shown in FIG. 5.

System 400 includes rough clustering component 402 and sub-clustering component 404. In one embodiment, rough clustering component 402 corresponds to the clustering system 250 shown in FIG. 3. Sub-clustering component 404 corresponds to a conventional document clustering system that clusters using vectors representing the words in a given document. Of course, the two components could be switched such that rough clustering component 402 is a conventional clustering component and sub-clustering component 404 corresponds to the association rules-based clustering component 250. In addition, both clustering components could be association rules-based clustering components as well. Also, if one of the components uses known clustering techniques, then any known technique can be used. However, the description will proceed with respect to rough clustering component 402 corresponding to clustering system 250 shown in FIG. 3, and sub-clustering component 404 being a conventional vector-based clustering component.

Therefore, rough clustering component 402 first receives a document from a document set stored in document store 406. This is indicated by block 500 in FIG. 6. As described with respect to FIG. 3, rough clustering component 402 identifies the NEs in the individual paragraphs of the documents received. This is indicated by block 502 in FIG. 6.

Rough clustering component 402 then performs rough clustering by accessing association rules 260 and matching the document against the association rules to determine which cluster the document under analysis belongs to. Performing rough clustering is indicated by block 504 in FIG. 6 and the rough clusters (the documents assigned to rough clusters) is indicated by block 408 in FIG. 5.

The rough clusters 408 are then provided to sub-clustering component 404 which performs sub-clustering to generate sub-clusters 410. Generating the sub-clusters is indicated by block 506 in FIG. 6. In one embodiment, sub-clustering component 404 generates vectors representative of the individual documents within the rough clusters 408. Sub-clustering component 404 then identifies sub-clusters, based on distances between those vectors, within the rough clusters 408. Vectors that are relatively close together are grouped into a sub-cluster.

FIG. 6A is a flow diagram better illustrating one embodiment of performing the rough clustering. In the embodiment illustrated in FIG. 6A, the rough clustering component 402 first identifies which rules have been matched by the incoming documents. This is indicated by block 508. Component 402 then reduces the number of words in the documents. For instance, the number of words can be reduced to those contained in the matched rules, as indicated by block 510. Of course, the words can be reduced in other ways as well. Rough clustering is then performed based on the reduced set of words. This is indicated by block 512. Of course, the full set of words can still be used for sub-clustering with sub-clustering component 404. However, by reducing the number of words used in rough clustering, clustering is still performed based on content words, but it is significantly speeded up, because the number of words used drops drastically.

In another embodiment, even where sub-clustering component 404 is a vector-based component, it can use the results of the rough clustering component 402 by using the important association rules as vectorial features in addition to the vocabulary features. For instance, where an important rule is matched by a given document, that can be indicated with a feature value in the vector used by sub-clustering component 404. Of course, the feature values in the vector can be used to indicate whether a corresponding document matches a wide variety of different association rules, and not just those deemed important.

Figure 7:
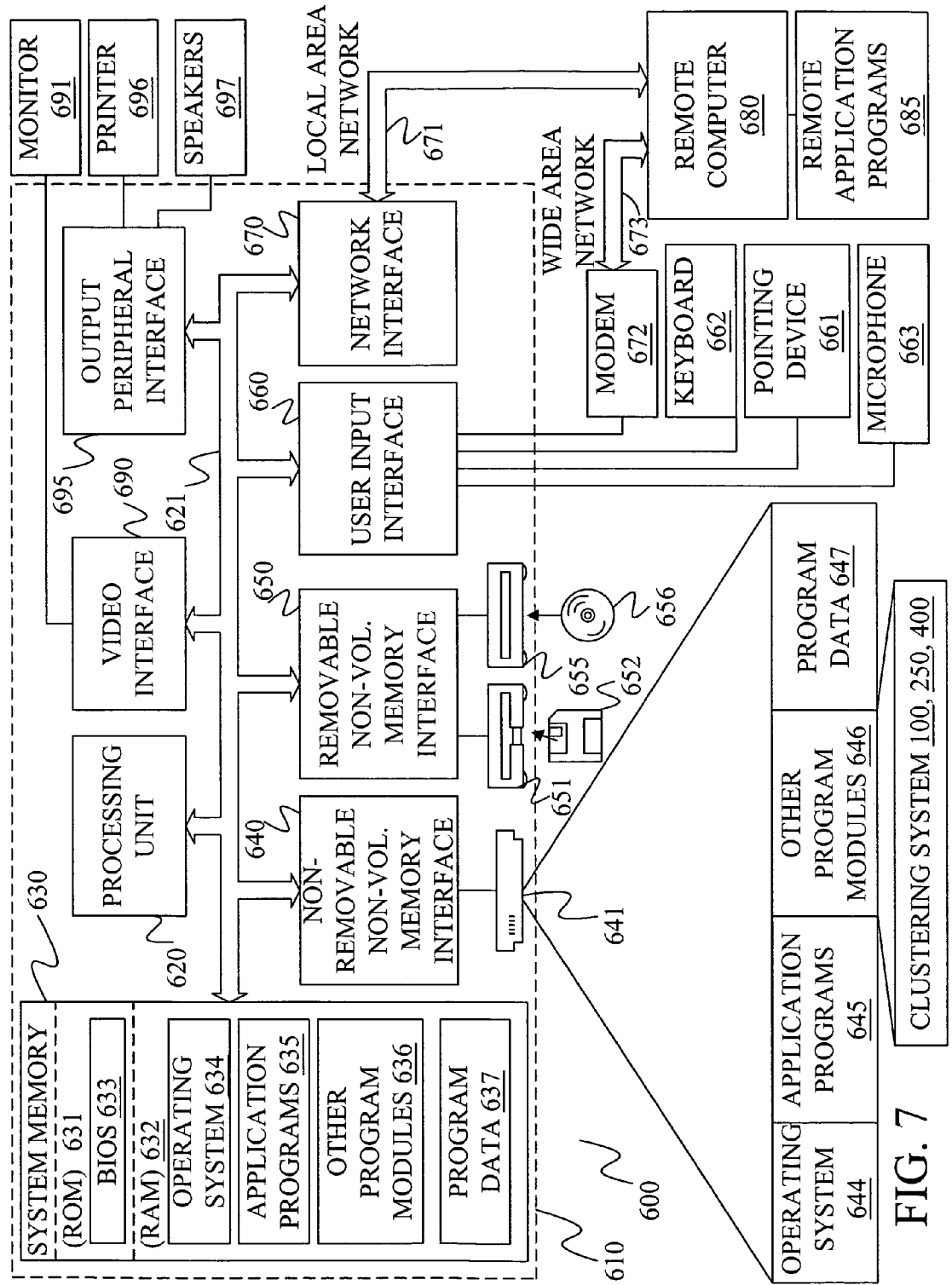
FIG. 7 is a block diagram of one illustrative computing environment.

FIG. 7 illustrates an example of a suitable computing system environment 600 on which embodiments may be implemented. The computing system environment 600 is only one example of a suitable computing environment and is not intended to suggest any limitation as to the scope of use or functionality of the claimed subject matter. Neither should the computing environment 600 be interpreted as having any dependency or requirement relating to any one or combination of components illustrated in the exemplary operating environment 600.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an exemplary system for implementing some embodiments includes a general-purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 7 illustrates operating system 634, application programs 635, other program modules 636, and program data 637.

The computer 610 may also include other removable/non-removable volatile/nonvolatile computer storage media. By way of example only, FIG. 7 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 7, provide storage of computer readable instructions, data structures, program modules and other data for the computer 610. In FIG. 7, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies.

FIG. 7 shows the clustering system in other program modules 646. It should be noted, however, that it can reside elsewhere, including on a remote computer, or at other places.

A user may enter commands and information into the computer 610 through input devices such as a keyboard 662, a microphone 663, and a pointing device 661, such as a mouse, trackball or touch pad. Other input devices (not shown) may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 is operated in a networked environment using logical connections to one or more remote computers, such as a remote computer 680. The remote computer 680 may be a personal computer, a hand-held device, a server, a router, a network PC, a peer device or other common network node, and typically includes many or all of the elements described above relative to the computer 610. The logical connections depicted in FIG. 7 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 7 illustrates remote application programs 685 as residing on remote computer 680. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of clustering documents on a computer with a processor and memory, comprising:

identifying, with the processor, entities in each of a plurality of documents in a set of documents;

obtaining, with a processor, association rules corresponding to an initial set of documents based on co-occurrences of the entities in the initial set of documents, each of the obtained association rules identifying one or more entities that co-occur with other entities in a given document in the initial set of documents with a frequency that meets a threshold;

assigning, with the processor, each of the documents in the set of documents to a first set of clusters in the memory, based on the obtained association rules corresponding to the initial set of documents;

after assigning each of the documents in the set of documents to the first set of clusters, then for each given cluster in the first set of clusters, deriving with the processor, a plurality of additional association rules based on co-occurrences of the entities within individual documents in the given cluster, each derived additional association rule being specific to the given cluster in the first set of clusters; and assigning, with the processor, newly received documents to clusters in the first set of clusters based on the obtained association rules and the derived plurality of additional association rules.

2. The method of claim 1 wherein obtaining association rules comprises:

providing a set of initial clusters of the initial set of documents; and accessing the obtained association rules corresponding to the initial set of clusters.

3. The method of claim 2 wherein assigning each of the documents to a first set of clusters comprises:

assigning each of the documents to one of the initial clusters or a new cluster based on a number of matches of each of the documents with the association rules corresponding to each cluster in the initial set of clusters.

4. The method of claim 1 and further comprising:
receiving new documents; and
repeating the steps of assigning documents to clusters and deriving a plurality of additional association rules for the new documents.

5. The method of claim 1 wherein obtaining association rules comprises:

generating a confidence score for each of the obtained association rules based on a frequency with which the given documents match each of the obtained association rules.

6. The method of claim 5 wherein assigning the documents is based on the confidence scores for association rules matched by the documents.

7. The method of claim 6 wherein generating a confidence score comprises:

modifying the confidence score for a given association rule each time a document being clustered matches the given association rule.

8. The method of claim 1 and further comprising:
clustering documents assigned to the given cluster into sub-clusters based on the obtained association rules and the derived additional association rules.

9. A document clustering system comprising:
a processor;
an application program embedded in a memory and executed by the processor, the executed application performs;

identifying entities in each of a plurality of documents in a set of documents;

obtaining association rules corresponding to an initial set of documents based on co-occurrences of the entities in the initial set of documents, each of the obtained association rules identifying one or more entities that co-occur with other entities in a given document in the initial set of documents with a frequency that meets a threshold;

assigning each of the documents in the set of documents to a first set of clusters in the memory, based on the obtained association rules corresponding to the initial set of documents;

after assigning each of the documents in the set of documents to the first set of clusters, then for each given cluster in the first set of clusters, deriving a plurality of additional association rules based on co-occurrences of the entities within individual documents in the given cluster, each derived additional association rule being specific to the given cluster in the first set of clusters; and assigning newly received documents to clusters in the first set of clusters based on the obtained association rules and the derived plurality of additional association rules.

10. The system of claim 9 and assigning newly received documents further comprising:

placing a newly received document in a sub-cluster within a selected cluster.

11. The system of claim 10 wherein placing the received document in the sub-cluster based on matches between a sub-cluster vector indicating word occurrence in documents in the sub-cluster and a document vector indicating word occurrence in the newly received document.

12. The system of claim 11 wherein the sub-cluster vector includes features indicative of association rules matched by documents in the sub-cluster and wherein the document vector includes features indicative of association rules matched by the newly received document.

13. The system of claim 10, wherein each of the obtained association rules includes an associated confidence measure and wherein the selected cluster is based on the confidence measure associated with each of the association rules that match the newly received document.

14. The system of claim 13 wherein the confidence score associated with each association rule matched by the newly received document is adjusted to reflect a match between each association rule and the newly received document.

* * * * *